United States Patent
Boo et al.

(10) Patent No.: US 12,415,383 B2
(45) Date of Patent: Sep. 16, 2025

(54) BRAKE APPARATUS FOR VEHICLE

(71) Applicant: HYUNDAI MOBIS Co., Ltd., Seoul (KR)

(72) Inventors: Sang Pil Boo, Yongin-si (KR); Mun Hwan Byoun, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 781 days.

(21) Appl. No.: 17/710,202

(22) Filed: Mar. 31, 2022

(65) Prior Publication Data

US 2022/0314691 A1 Oct. 6, 2022

(30) Foreign Application Priority Data

Apr. 2, 2021 (KR) .................. 10-2021-0043272
Apr. 12, 2021 (KR) .................. 10-2021-0047230

(51) Int. Cl.
*B60B 27/00* (2006.01)
*F16D 55/227* (2006.01)
(Continued)

(52) U.S. Cl.
CPC ...... *B60B 27/0063* (2013.01); *B60B 27/0052* (2013.01); *F16D 55/227* (2013.01);
(Continued)

(58) Field of Classification Search
CPC ............. F16D 65/0068; F16D 65/0056; F16D 65/095; F16D 65/18; F16D 55/226;
(Continued)

(56) References Cited

U.S. PATENT DOCUMENTS 4,084,666 A * 4/1978 Karasudani ........... F16D 55/227
188/73.45
4,446,948 A * 5/1984 Melinat ............. F16D 55/22655
188/73.34
(Continued)

FOREIGN PATENT DOCUMENTS

JP 2015-054659 A 3/2015
KR 10-2010-0098846 A 9/2010
WO WO-2013141427 A1 * 9/2013 ........... B60K 17/046

OTHER PUBLICATIONS

Office Action issued on Jun. 13, 2025 in the corresponding Korean Patent Application No. 10-2021-0043272 Noted: U.S. Pat. No. 6073733 A previously cited therein already of record.

*Primary Examiner* — Christopher P Schwartz
(74) *Attorney, Agent, or Firm* — Morgan, Lewis & Bockius LLP

(57) ABSTRACT

A brake apparatus for a vehicle may include: a caliper body module provided with a finger part and a cylinder part spaced apart from each other and facing each other, a pad plate part disposed between the finger part and the cylinder part, and configured to selectively come into contact with a disk module rotated together with a rotor to generate a braking force, a piston module installed in the cylinder part to be movable forward and backward and configured to press the pad plate part, a guide member disposed on both sides of the caliper body module and configured to movably support the caliper body module, and a first fastening member extending from the guide member and fastened to a first mounting member provided in a stator.

19 Claims, 16 Drawing Sheets

(51) Int. Cl.
 *F16D 65/00* (2006.01)
 *B60K 7/00* (2006.01)
 *F16D 55/00* (2006.01)

(52) U.S. Cl.
 CPC ..... *F16D 65/0056* (2013.01); *F16D 65/0068* (2013.01); *F16D 65/0081* (2013.01); *F16D 65/0087* (2013.01); *B60B 27/0047* (2013.01); *B60K 7/0007* (2013.01); *B60K 2007/0092* (2013.01); *F16D 2055/0008* (2013.01); *F16D 2055/0016* (2013.01)

(58) Field of Classification Search
 CPC ..... F16D 2055/0008; F16D 2055/0016; F16D 2121/04; F16D 2121/06; H02K 7/102; B60K 7/0007
 USPC .................................. 188/73.44, 73.45, 370
 See application file for complete search history.

(56) References Cited

U.S. PATENT DOCUMENTS

| | | | | |
|---|---|---|---|---|
| 4,480,724 | A * | 11/1984 | Hoffman, Jr. ......... | F16D 55/227 188/73.44 |
| 4,776,435 | A * | 10/1988 | Morita .............. | F16D 55/22655 188/73.31 |
| 4,781,273 | A * | 11/1988 | Fujinami ................ | B61H 5/00 188/73.45 |
| 6,073,733 | A * | 6/2000 | Kapanowski ........... | F16D 65/18 188/72.4 |
| 10,118,479 | B2 * | 11/2018 | Igi ....................... | F16D 55/2265 |

\* cited by examiner

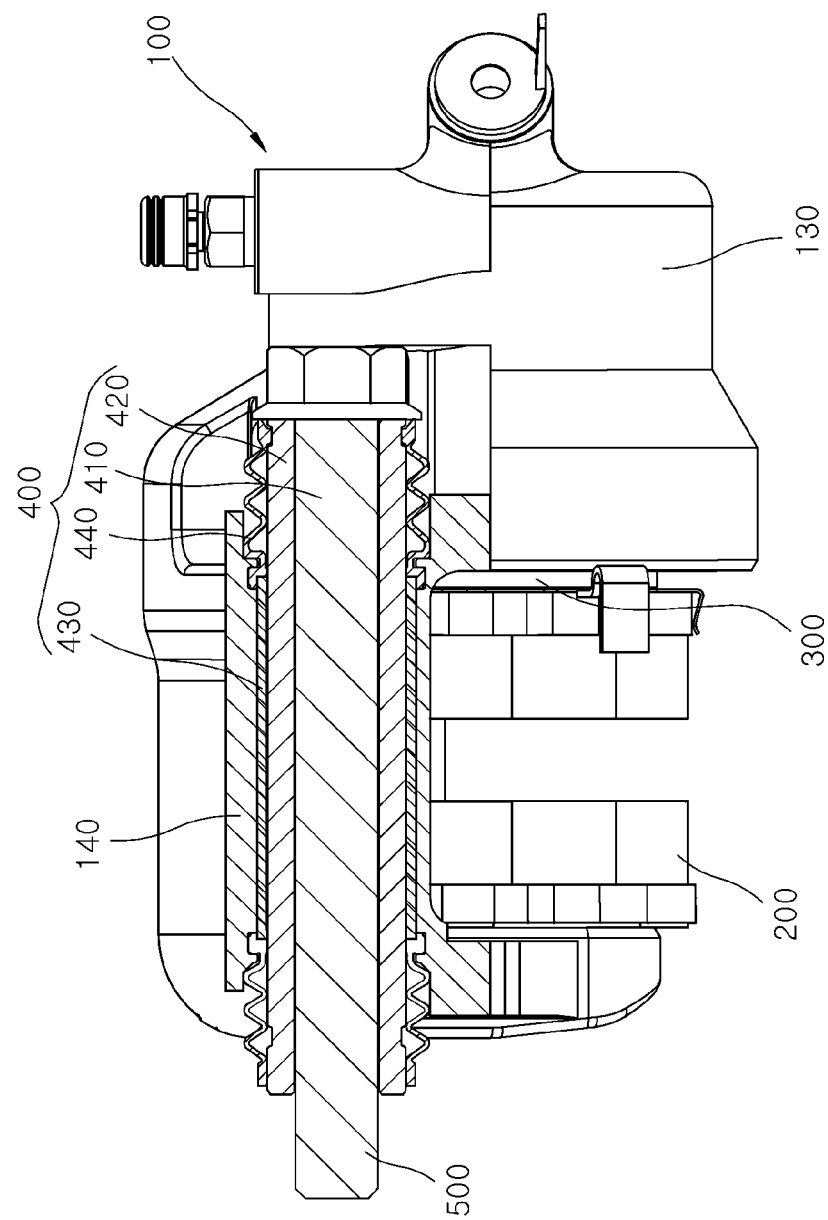

BRAKE APPARATUS FOR VEHICLE

CROSS-REFERENCE TO RELATED APPLICATION

This application claims priority from and the benefit of Korean Patent Application No. 10-2021-0043272, filed on Apr. 2, 2021 and Korean Patent Application No. 10-2021-0047230, filed on Apr. 12, 2021, which are hereby incorporated by reference for all purposes as if set forth herein.

BACKGROUND

Field

Exemplary embodiments of the present disclosure relate to a brake apparatus for a vehicle, and more particularly, to a brake apparatus for a vehicle provided with an in-wheel motor.

Discussion of the Background

In general, a brake apparatus for a vehicle is an apparatus that pushes a piston through hydraulic pressure generated from a master cylinder or a rotational force of a motor to bring a pad and a disk into close contact with each other, and brakes a vehicle by using friction between the pad and the disk. As such a brake apparatus for a vehicle, a floating type caliper brake composed of a caliper body and a torque member is widely used.

However, in an e-corner module vehicle that is a next-generation platform, an in-wheel driving device, which is mounted inside each wheel of the vehicle so that each wheel may be controlled by independent driving, is installed. Such an in-wheel itself is constituted by one driving motor and thus has a very narrow space for mounting a brake apparatus. Therefore, there is a problem in that it is difficult to satisfy internal layout conditions of the in-wheel and simultaneously secure braking safety equivalent to that of a general brake system through an existing mass-produced caliper brake.

The background art of the present disclosure is disclosed in Korean Patent Application Laid-Open No. 10-2010-0098846 (published on Sep. 10, 2010 and entitled "Disk Brake having Parking Function").

SUMMARY

Various embodiments are directed to a brake apparatus for a vehicle, capable of satisfying layout conditions of an in-wheel motor and improving assembling efficiency of a caliper body.

In order to solve the above problems, a brake apparatus for a vehicle in accordance with the present disclosure may include: a caliper body module provided with a finger part and a cylinder part spaced apart from each other and facing each other; a pad plate part disposed between the finger part and the cylinder part, and configured to selectively come into contact with a disk module rotated together with a rotor to generate a braking force; a piston module installed in the cylinder part to be movable forward and backward and configured to press the pad plate part; a guide member disposed on both sides of the caliper body module and configured to movably support the caliper body module; and a first fastening member extending from the guide member and fastened to a first mounting member provided in a stator.

Furthermore, the first fastening member may be disposed on substantially the same axial line as the guide member.

Furthermore, the first fastening member may protrude to an outside of the finger part by a predetermined distance along a longitudinal direction of the guide member.

Furthermore, a first fastening reinforcing part may be provided on an outer periphery of the first fastening member to reinforce a fastening force of the first fastening member with respect to the first mounting member.

Furthermore, a central axis of the guide member may be disposed at substantially the same height as a gravity axis of the caliper body module.

Furthermore, the guide member may include: a guide pin part configured to penetrate the caliper body module and disposed in a direction parallel to a forward and backward movement direction of the piston module; a friction reduction part configured to surround the guide pin part; a movement part slidably connected to the friction reduction part and configured to move the caliper body module by a pressing force of the piston module; and a blocking part configured to block foreign substances from entering between the caliper body module and the friction reduction part.

Furthermore, the guide pin part may have one side connected through the finger part.

Furthermore, the guide pin part may movably support the pad plate part.

A brake apparatus for a vehicle in accordance with the present disclosure may include: a caliper body module provided with a finger part and a cylinder part spaced apart from each other and facing each other; a pad plate part disposed between the finger part and the cylinder part, and configured to selectively come into contact with a disk module rotated together with a rotor to generate a braking force; a piston module installed in the cylinder part to be movable forward and backward and configured to press the pad plate part; a guide member disposed on both sides of the caliper body module and configured to movably support the caliper body module; and a second fastening member extending from the guide member and fastened to a second mounting member provided in a knuckle.

Furthermore, the second fastening member may be disposed on substantially the same axial line as the guide member.

Furthermore, the second fastening member may protrude to an outside of the caliper body module by a predetermined distance along a longitudinal direction of the guide member.

Furthermore, a second fastening reinforcing part may be provided on an outer periphery of the second fastening member to reinforce a fastening force of the second fastening member with respect to the second mounting member.

Furthermore, a central axis of the guide member may be disposed at substantially the same height as a gravity axis of the caliper body module.

Furthermore, the guide member may include: a guide pin part configured to penetrate the caliper body module and disposed in a direction parallel to a forward and backward movement direction of the piston module; a friction reduction part configured to surround the guide pin part; a movement part slidably connected to the friction reduction part and configured to move the caliper body module by a pressing force of the piston module; and a blocking part configured to block foreign substances from entering between the caliper body module and the friction reduction part.

Furthermore, the guide pin part may have one side connected through the finger part.

A brake apparatus for a vehicle in accordance with the present disclosure may include: a stator; a rotor disposed inside the stator and rotated when power is applied to the stator; a wheel rotated in connection with the rotor; a disk module interlocked with the rotor; an internal braking device mounted on the stator and configured to provide a frictional force to one side of the disk module; and an external braking device mounted on the stator and configured to provide a frictional force to the other side of the disk module.

Furthermore, the stator may include: a housing unit mounted with the external braking device and fixedly coupled to a fixed unit; a stator body mounted on the housing unit and configured to surround the rotor and rotate the rotor when power is applied; and an internal space in the housing unit configured to accommodate the internal braking device.

Furthermore, the internal braking device may include: an internal piston part mounted in the internal space and having a variable length; and an internal pad part mounted on the internal piston part and being in surface contact with the disk module according to a change in the length of the internal piston part.

Furthermore, the internal braking device may include: an internal case mounted in the internal space and coupled to the external braking device; an internal variable part mounted in the internal case and having a variable length; and an internal contact part mounted on the internal variable part and being in surface contact with the disk module according to a change in the length of the internal variable part.

Furthermore, the external braking device may include: an external case coupled to the stator; an external variable part mounted in the external case and having a variable length; and an external contact part mounted on the external variable part and being in surface contact with the disk module according to a change in the length of the external variable part.

According to a brake apparatus for a vehicle in accordance with the present disclosure, a first fastening member is fastened to a first mounting member provided in a stator to fix a caliper body module, thereby substantially preventing the caliper body module from being kept in an unassembled state in a process in which a rotator, the stator, and a disk module are coupled to a vehicle body or a knuckle.

Furthermore, according to a brake apparatus for a vehicle in accordance with the present disclosure, the first fastening member and a second fastening member may be disposed on substantially the same axial line as a guide member and may play a role of a torque member formed in an existing brake caliper on substantially the same axial line as the guide member, thereby substantially preventing interference with parts inside an in-wheel.

Furthermore, according to a brake apparatus for a vehicle in accordance with the present disclosure, a guide pin part may be connected through a finger part, thereby sufficiently securing the rigidity of the finger part and reducing the thicknesses of the caliper body module in a height direction and a longitudinal direction at the same time.

Furthermore, according to a brake apparatus for a vehicle in accordance with the present disclosure, a central axis of the guide member may be disposed at substantially the same height as a gravity axis of the caliper body module, thereby reducing a moment generated in the caliper body module when the caliper body module slides and thus substantially preventing vibration and noise from being generated.

Furthermore, according to a brake apparatus for a vehicle in accordance with the present disclosure, an internal braking device and an external braking device may be fixed to the stator, thereby improving the assembling efficiency of the vehicle body and securing the rigidity of the internal braking device and the external braking device.

BRIEF DESCRIPTION OF THE DRAWINGS

FIG. 4 is a cross-sectional view schematically illustrating the configuration of a guide member in accordance with the first embodiment of the present disclosure.

DETAILED DESCRIPTION OF THE ILLUSTRATED EMBODIMENTS

Figure 1:
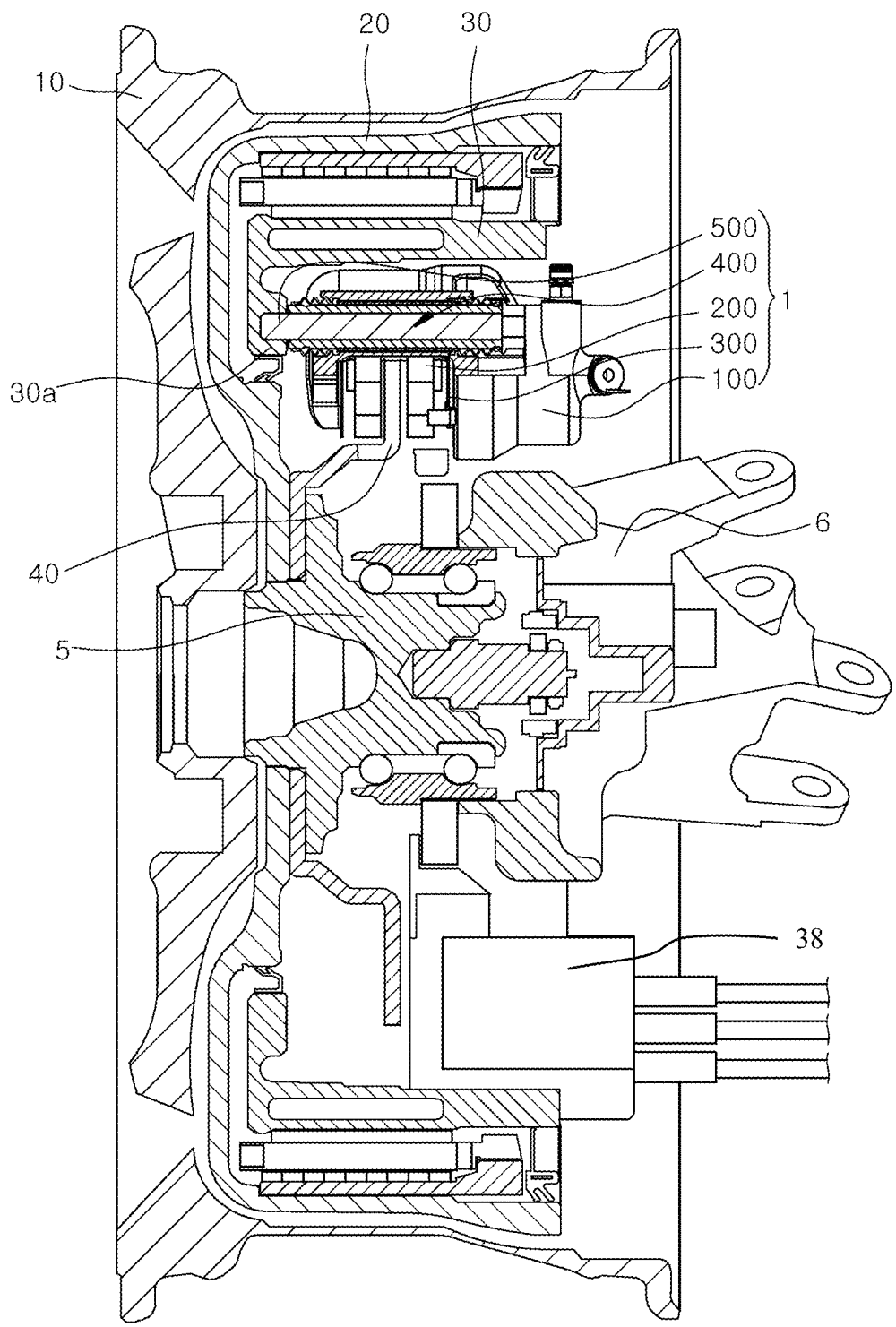
FIG. 1 is a cross-sectional view schematically illustrating an installation state of a brake apparatus for a vehicle in accordance with a first embodiment of the present disclosure.

Hereinafter, embodiments of a brake apparatus for a vehicle in accordance with the present disclosure will be described with reference to the accompanying drawings.

In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Furthermore, in the present specification, when a certain part is referred to as being "connected (or coupled) to" another part, it may indicate that the former part is directly connected (or coupled) to the latter part or indirectly connected (or coupled) to the latter part with another part interposed therebetween. In the present specification, when a certain part "includes (or comprises)" a certain component, it means that the element does not exclude another component but may further "include (or comprise)" another component, unless referred to the contrary.

Furthermore, substantially the same reference numerals may refer to substantially the same components throughout the present specification. Even though substantially the same reference numerals or similar reference numerals are not mentioned or described in a specific drawing, the reference numerals may be described based on other drawings. Furthermore, even though there is a portion which is not indicated by reference numerals in a specific drawing, the portion may be described based on other drawings. Furthermore, the number, shapes, and sizes of detailed components included in the drawings of the present application and relative differences in the sizes are set for convenience of understanding, and do not limit embodiments and may be implemented in various forms.

FIG. 1 is a cross-sectional view schematically illustrating an installation state of a brake apparatus 1 for a vehicle in accordance with a first embodiment of the present disclosure.

Referring to FIG. 1, a rotor 20 and a stator 30 are installed inside a wheel 10 of a vehicle and generate a driving force and rotate the wheel 10.

The rotor 20 is installed inside the wheel 10 and is rotated under the influence of a magnetic field formed by the stator 30 to be described below. The rotor 20 in accordance the present embodiment is formed in a cylindrical shape having a "C"-shaped cross-section with one side open, and is disposed so that its outer peripheral surface faces an inner peripheral surface of the wheel 10. The rotor 20 is disposed so that its central axis is located on substantially the same axial line at the central axis of the wheel 10, and is connected to the wheel 10 via a wheel bearing 5. The rotor 20 is configured to include a magnetic body such as a permanent magnet or metal, is rotated under the influence of a magnetic field formed by the stator 30, and rotates the wheel 10.

The stator 30 is installed inside the rotor 20, and receives power from an exterior to form a magnetic field that rotates the rotor 20. The stator 30 in accordance with the present embodiment is formed in the form of a hollow ring having an "L"-shaped cross-section, and is disposed so that its outer peripheral surface faces an inner peripheral surface of the rotor 20. The stator 30 is configured to include an electromagnet and rotates the rotor 20 by an electromagnet force generated as power is supplied from an exterior. A connector 38 connects the stator 30 to an external power source to supply power to the stator 30. The stator 30 is fixed to a knuckle 6, a motor bracket (not illustrated), or the like fixed to a vehicle body, and is restricted from rotating inside the wheel 10.

The stator 30 is provided with a first mounting member 30a that fixes the brake apparatus 1 for a vehicle in accordance with the present embodiment to the stator 30. A detailed shape of the first mounting member 30a will be described below.

A disk module 40 is provided to be rotatable together with the rotor 20. The disk module 40 in accordance with the present embodiment is formed to have a disk shape and is disposed inside the stator 30. The disk module 40 is connected to the wheel 10 and the rotor 20 via the wheel bearing 5 and is rotated together with the rotor 20 when the rotor 20 is rotated. A diameter of the disk module 40 can be variously changed in design according to a diameter and the like of the wheel 10.

The brake apparatus 1 for a vehicle in accordance with the present embodiment is disposed between the stator 30 and the disk module 40, is provided to be able to allow or limit the rotation of the disk module 40, and generates a braking force in the vehicle. The brake apparatus 1 for a vehicle is fixed to the stator 30 via the first mounting member 30a described above.

Figure 2:
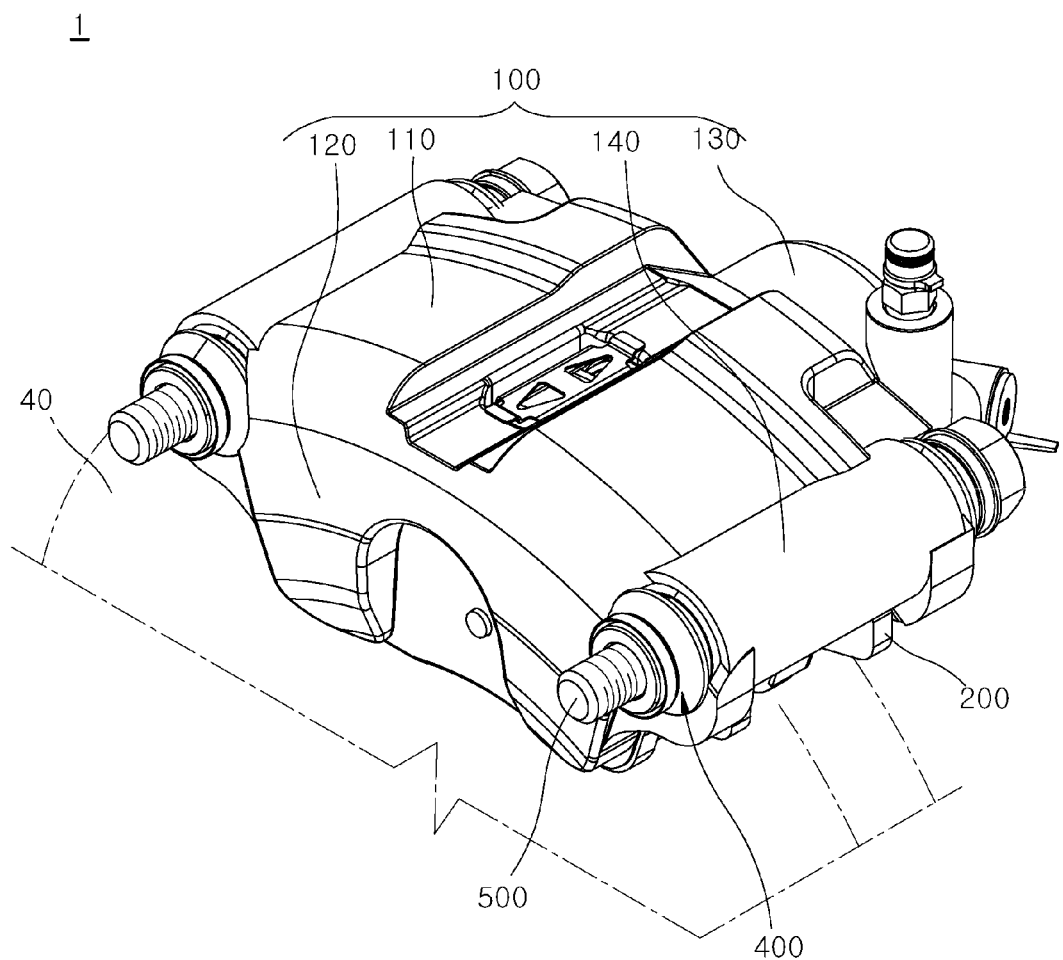
FIG. 2 is a perspective view schematically illustrating the configuration of the brake apparatus for a vehicle in accordance with the first embodiment of the present disclosure.
Figure 3A:
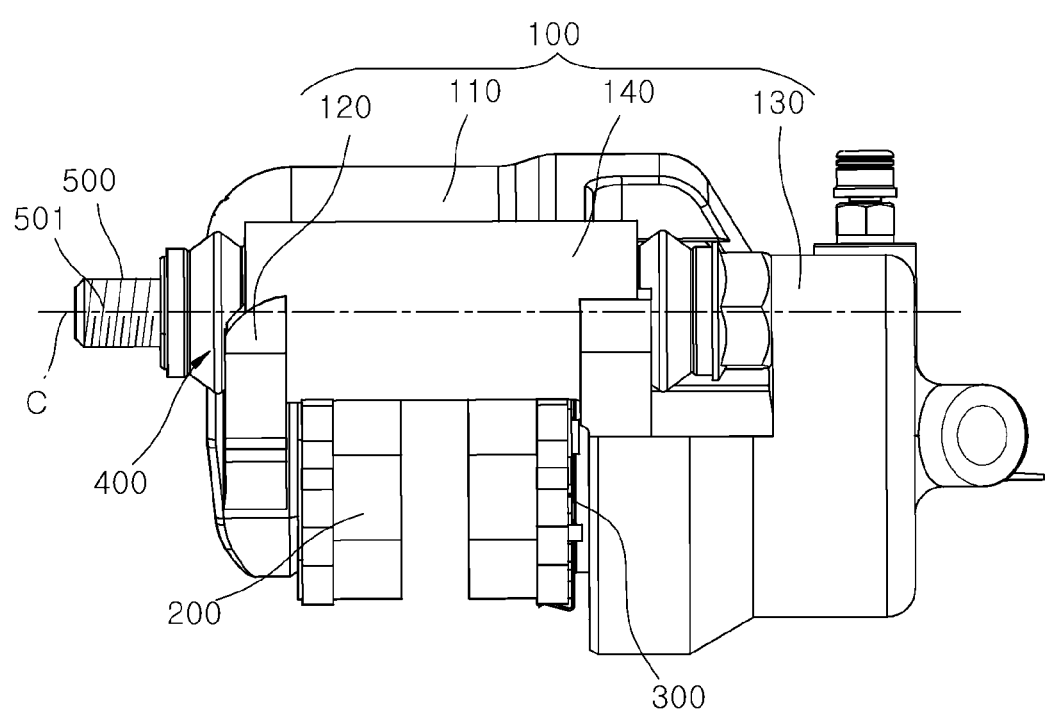
FIG. 3A and FIG. 3B are a side view and a front view schematically illustrating the configuration of the brake apparatus for a vehicle in accordance with the first embodiment of the present disclosure.
Figure 3B:
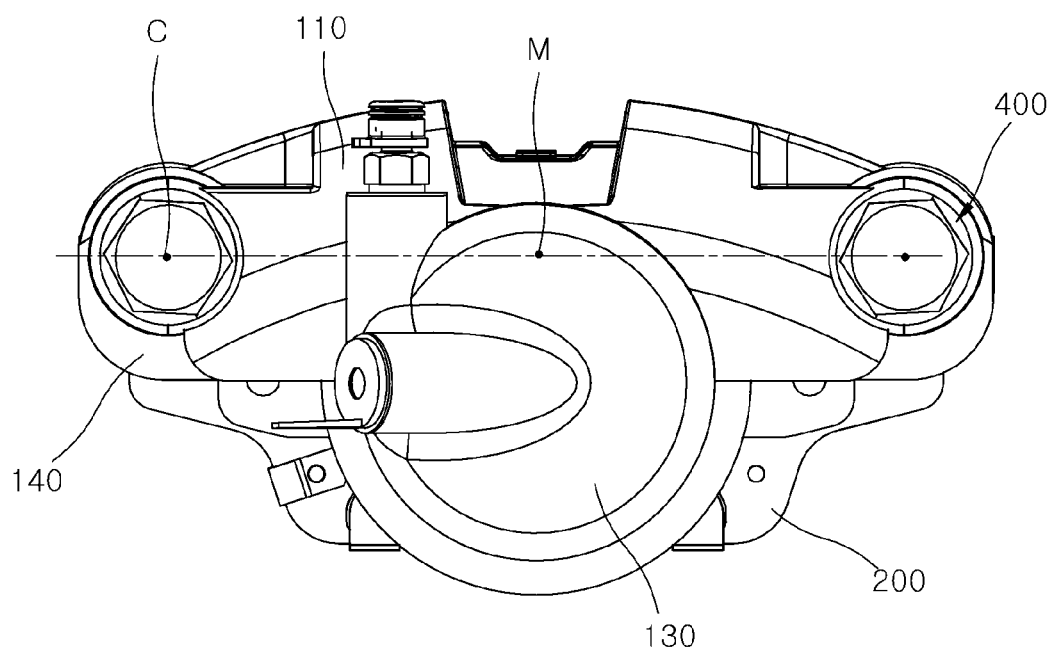

FIG. 2 is a perspective view schematically illustrating the configuration of the brake apparatus 1 for a vehicle in accordance with the first embodiment of the present disclosure, and FIG. 3A and FIG. 3B are a side view and a front view schematically illustrating the configuration of the brake apparatus 1 for a vehicle in accordance with the first embodiment of the present disclosure.

Referring to FIG. 1 to FIG. 3, the brake apparatus 1 for a vehicle in accordance with the present embodiment includes a caliper body module 100, a pair of pad plate parts 200, a piston module 300, a guide member 400, and a first fastening member 500.

The caliper body module 100 forms a schematic appearance of the brake apparatus 1 for a vehicle. The caliper body module 100 in accordance with the present embodiment includes a bridge part 110, a finger part 120, a cylinder part 130, and an accommodating part 140.

The bridge part 110 forms an upper appearance of the caliper body module 100, and supports the finger part 120, the cylinder part 130, and the accommodating part 140 as a whole, which will be described below.

The finger part 120 vertically extends downward from a front end of the bridge part 110. The finger part 120 is disposed so that its internal side surface faces one of the pair of pad plate parts 200, which is disposed outside (left side in FIG. 1) the disk module 40. The finger part 120 slides by a pressing force of the piston module 300 to be described below, and presses the pad plate part 200 to the disk module 40 or releases the pressure. The finger part 120 may be integrally formed with the bridge part 110 by welding, press working, bending, or the like, and alternatively, may be detachably coupled to the bridge part 110 by bolting or the like.

The cylinder part 130 vertically extends downward from the rear of the bridge part 110. The cylinder part 130 is formed so that one side thereof is opened so as to provide a space where the piston module 300 to be described below is installed therein. The cylinder part 130 is disposed so that the opened side faces one of the pair of pad plate parts 200, which is disposed inside (see FIG. 1) the disk module 40. The cylinder part 130 may be integrally formed with the bridge part 110 by welding, press working, bending, or the like, and alternatively, may be detachably coupled to the bridge part 110 by bolting or the like.

The accommodating part 140 is provided as a pair and the pair of accommodating parts 140 are disposed on both sides of the caliper body module 100, respectively. A through hole is formed by horizontally penetrating the front and rear surfaces of the accommodating part 140 to provide a space into which the guide member 400 to be described below is inserted. The accommodating part 140 is slidably connected to the guide member 400. The accommodating part 140 slides along the guide member 400 in a direction opposite to the forward and backward movement of the piston module 300, and moves the caliper body module 100. The accommodating part 140 may be integrally formed with the bridge part 110 by welding, press working, bending, or the like, and alternatively, may be detachably coupled to the bridge part 110 by bolting or the like.

The pad plate part 200 is disposed between the finger part 120 and the cylinder part 130, and selectively comes into contact with the disk module 40 rotated together with the rotor 20 to generate a braking force. The pad plate part 200 in accordance with the present embodiment is provided as a pair, and the pair of pad plate parts 200 are disposed to face the outer and inner side surfaces of the disk module 40, respectively. The pair of pad plate parts 200 are installed with the disk module 40 interposed therebetween so as to movable in a direction away from or close to the disk module 40. In such a case, the pad plate parts 200 may be movably supported by the caliper body module 100, the guide member 400, and the like. A friction pad made of a material having a high frictional coefficient such as rubber may be attached to one surface of the pad plate part 200 facing the disk module 40. A detailed shape of the pad plate part 200 can be variously changed in design within the technical spirit of a brake pad that comes into contact with the disk module 40 and applies a braking force to the vehicle.

The piston module 300 is installed in the cylinder part 130 to move forward and backward and presses the pad plate parts 200. The piston module 300 is disposed so that its one side faces one of the pair of pad plate parts 200, which is disposed inside (see FIG. 1) the disk module 40. The piston module 300 is connected to an electric motor, receives a rotational force from the electric motor, and moves forward and backward with respect to the pad plate parts 200. The piston module 300 protrudes in front of the cylinder part 130 when moving forward and presses the pad plate parts 200. The piston module 300 slides the caliper body module 100 in a direction opposite to the forward/backward movement direction of the piston module 300 along the longitudinal direction of the guide member 400 by a reactional force generated by pressing the pad plate parts 200. The piston module 300 returns to the inside of the cylinder part 130 when moving backward and releases the pressure on the pad plate parts 200. The piston module 300 in accordance with the present embodiment may include a spindle that is rotated by the electric motor and has threads provided on the outer circumferential surface thereof, a nut that is screwed to the spindle to move linearly along the longitudinal direction of the spindle when the spindle is rotated, and a piston that moves forward and backward with respect to the pad plate parts 200 by a pressing force applied during the linear motion of the nut and pressures the pad plate parts 200 or releases the pressure on the pad plate parts 200.

The guide member 400 is disposed on both sides of the caliper body module 100 and movably supports the caliper body module 100. That is, the guide member 400 is installed inside the accommodating part 140 and is provided to guide the slide movement of the caliper body module 100 due to the reactional force by the piston module 300. The guide member 400 is provided as a pair, and the pair of guide members 400 are installed inside the pair of accommodating parts 140, respectively. A central axis C of the guide member 400 may be disposed at substantially the same height as a gravity axis M of the caliper body module 100. Accordingly, the guide member 400 can reduce a moment generated in the caliper body module 100 when the caliper body module 100 slides, thereby substantially preventing vibration and noise from being generated.

FIG. 4 is a cross-sectional view schematically illustrating the configuration of the guide member 400 in accordance with the first embodiment of the present disclosure.

Referring to FIG. 4, the guide member 400 in accordance with the present embodiment includes a guide pin part 410, a friction reduction part 420, a movement part 430, and a blocking part 440.

The guide pin part 410 penetrates the caliper body module 100 and is disposed in a direction parallel to the forward/backward movement direction of the piston module 300. The guide pin part 410 in accordance with the present embodiment is formed in a rod shape having a circular cross-section. A front end of the guide pin part 410 is inserted into a rear surface of the accommodating part 140, so that the guide pin part 410 horizontally penetrates the front and rear surfaces of the accommodating part 140. The central axis C of the guide pin part 410 is disposed at substantially the same height as the gravity axis M of the caliper body module 100. A diameter of the guide pin part 410 may have a value smaller than that of the through hole of the accommodating part 140. The guide pin part 410 may be provided at the rear end thereof with a head part that supports the guide pin part 410 in contact with the rear surface of the accommodating part 140 when the guide pin part 410 is completely inserted into the accommodating part 140. The front end of the guide pin part 410 may be connected through the finger part 120 to reinforce the support rigidity of the finger part 120 extending from the bridge part 110. Accordingly, the guide pin part 410 may reduce the thicknesses of the bridge part 110 in the height direction and the longitudinal direction, so that the size of the caliper body module 100 may be designed to fit the layout of an in-wheel.

The friction reduction part 420 is disposed to surround the guide pin part 410 and supports the movement part 430, which will be described below, to be slidably movable. The friction reduction part 420 in accordance with the present embodiment is formed in a hollow cylindrical shape and is closely fixed to an outer circumferential surface of the guide pin part 410. The friction reduction part 420 may have a smooth surface or include a material having a low frictional coefficient. The friction reduction part 420 may be manufactured separately from the guide pin part 410 and assembled to the guide pin part 410, and alternatively, may be installed by being integrally applied onto the outer circumferential surface of the guide pin part 410.

One side of the movement part 430 is slidably connected to the friction reduction part 420 and the other side thereof is connected to the caliper body module 100. The movement part 430 slides along the longitudinal direction of the guide pin part 410 by the pressing force of the piston module 300, and moves the caliper body module 100. The movement part 430 in accordance with the present embodiment is formed in a hollow cylindrical shape and is disposed to surround the friction reduction part 420. An inner circumferential surface of the movement part 430 is slidably in contact with an inner circumferential surface of the friction reduction part 420. An outer inner circumferential surface of the movement part 430 is fixed to an inner circumferential surface of the accommodating part 140.

The blocking part 440 blocks foreign substances from entering between the caliper body module 100 and the friction reduction part 420. The blocking part 440 in accordance with the present embodiment is formed in a hollow cylindrical shape and is disposed to surround an outer circumferential surface of the friction reduction part 420. The blocking part 440 has one end fixed to the outer circumferential surface of the friction reduction part 420 and the other end fixed to the inner circumferential surface of the accommodating part 140, thereby sealing between the accommodating part 140 and the friction reduction part 420. When the caliper body module 100 slides, the other end of the blocking part 440 moves together with the caliper body module 100 in a state in which the one end thereof is fixed to the friction reduction part 420. In such a case, the blocking part 440 may be formed to have a wavy structure or a bellows structure in cross section so as to be stretchable in the longitudinal direction thereof. Accordingly, the blocking part 440 may not interfere with the slide movement of the caliper body module 100 and substantially maintain foreign substance blocking performance at the same time. The blocking part 440 may be provided as a pair and the pair of blocking parts 440 may be disposed on both front and rear sides of the accommodating part 140, respectively.

The guide member 400 in accordance with the present embodiment may be provided to movably support the pad plate parts 200.

Figure 5:
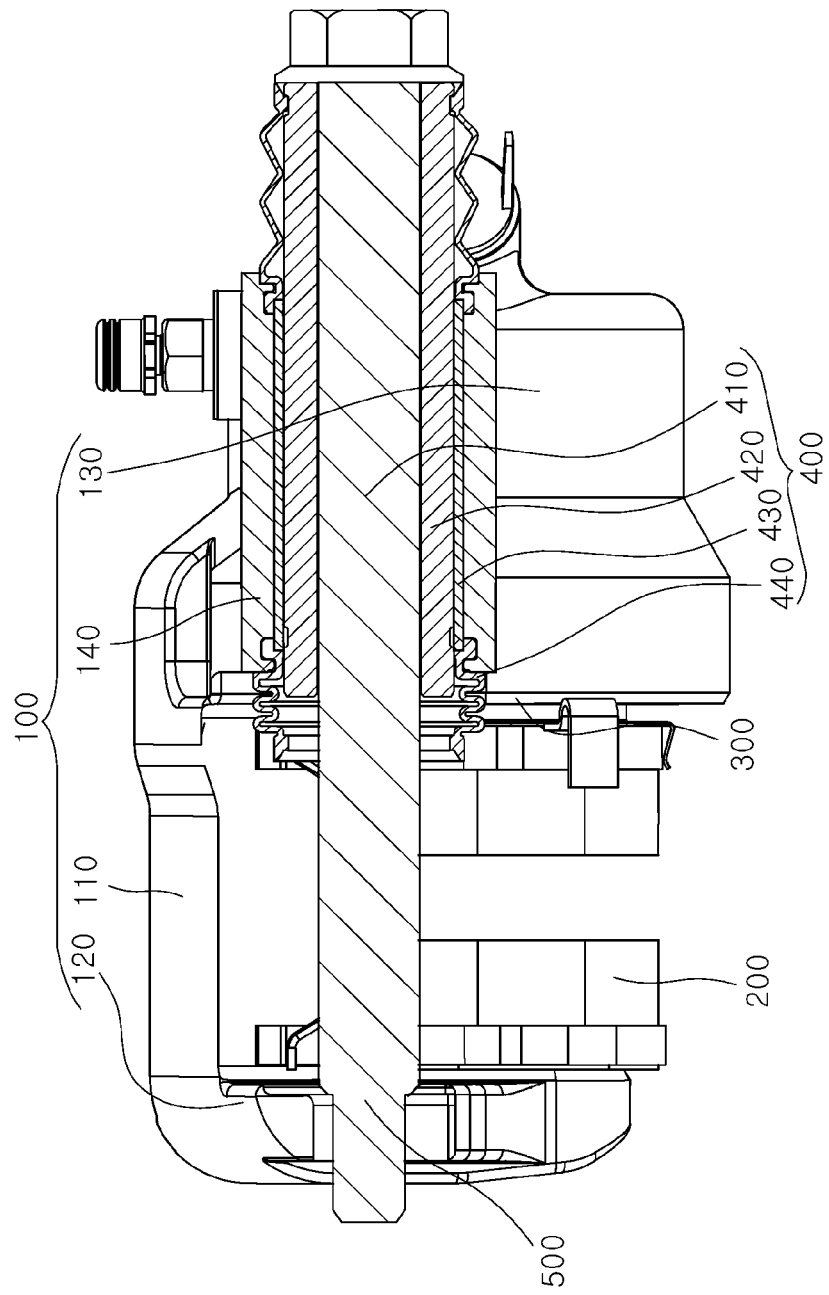
FIG. 5 is a cross-sectional view schematically illustrating a state in which the guide member in accordance with the first embodiment of the present disclosure supports a pad plate part.

FIG. 5 is a cross-sectional view schematically illustrating a state in which the guide member 400 in accordance with the first embodiment of the present disclosure supports the pad plate part 200.

Referring to FIG. 5, the accommodating part 140 and the friction reduction part 420 are each formed to have a length so that the front ends thereof may be located behind the pad plate part 200 disposed behind (right side in FIG. 5) the disk module 40.

The guide pin part 410 horizontally extends in front of the accommodating part 140, and the front end of the guide pin part 410 is connected through the finger part 120. Accordingly, the outer circumferential surface of a front portion of the guide pin part 410 is exposed to an exterior.

The pair of pad plate parts 200 are slidably mounted on the outer circumferential surface of the front portion of the guide pin part 410 exposed to an exterior, and are moved in the front-rear direction along the longitudinal direction of the guide pin part 410.

The first fastening member 500 extends from the guide member 400. The first fastening member 500 is detachably fastened to the first mounting member 30*a* provided in the stator 30, and supports the caliper body module 100. Accordingly, the first fastening member 500 may substantially prevent the caliper body module 100 from being kept in an unassembled state inside the wheel 10 until the rotator 20, the stator 30, and the disk module 40 are fixed to the vehicle body or the knuckle 6. The first fastening member 500 may be disposed on substantially the same axial line as the guide member 400. Accordingly, the first fastening member 500 may play a role of a torque member, which is formed in an existing brake caliper, on substantially the same axial line as the guide member 400, thereby more easily satisfying the internal layout conditions of the inwheel.

The first mounting member 30*a* vertically protrudes from the inner side surface of the stator 30 disposed in parallel to the radial direction of the wheel 10. The first mounting member 30*a* may be formed in a hollow shape with one side open so that the first fastening member 500 may be inserted thereinto. The opened side of the first mounting member 30*a* may be disposed to face the first fastening member 500 and the central axis thereof may be disposed on substantially the same axial line as the central axis C of the guide member 400.

Figure 6:
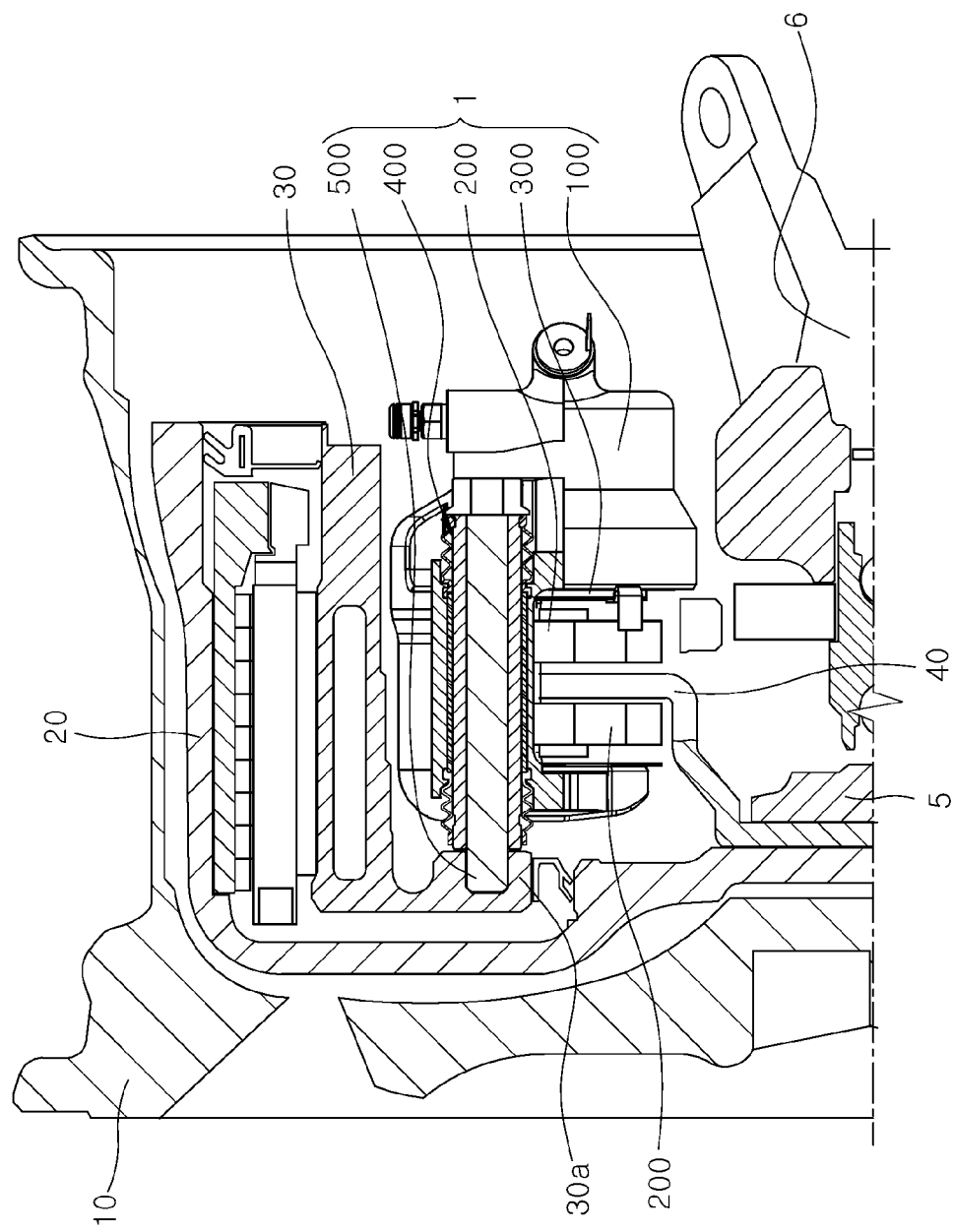
FIG. 6 is an enlarged view schematically illustrating the configuration of a first fastening member in accordance with the first embodiment of the present disclosure.

FIG. 6 is an enlarged view schematically illustrating the configuration of the first fastening member 500 in accordance with the first embodiment of the present disclosure.

Referring to FIG. 1, FIG. 2, and FIG. 6, the first fastening member 500 in accordance with the present embodiment may be formed in a rod shape extending horizontally from the front end of the guide pin part 410 along the longitudinal direction of the guide member 400. The central axis of the first fastening member 500 is disposed on substantially the same axial line as the central axis C of the guide pin part 410. The first fastening member 500 protrudes to the outside of the finger part 120 by a predetermined distance as the front end of the guide pin part 410 penetrates the finger part 120. The protruding distance of the first fastening member 500 may be changed in design to various values according to a distance between the front end of the guide pin part 410 and the first mounting member 30*a*, and the like. The first fastening member 500 is inserted into the first mounting member 30*a* while the rotator 20, the stator 30, and the disk module 40 are assembled into the wheel 10, and is fastened to the first mounting member 30*a* to fix the position of the caliper body module 100.

A first fastening reinforcing part 501 may be provided on an outer periphery of the first fastening member 500 to reinforce a fastening force of the first fastening member 500 with respect to the first mounting member 30*a*. The first fastening reinforcing part 501 in accordance with the present embodiment may be formed in the form of threads that protrude from the outer circumferential surface of the first fastening member 500 and extend along the longitudinal direction of the first fastening member 500. In such a case, threads corresponding to the first fastening reinforcing part 501 may be formed on the inner circumferential surface of the first mounting member 30*a*. The shape of the first fastening reinforcing part 501 is not limited to the shape of the thread, and may be variously changed in design within the technical spirit of a shape capable of reinforcing the fastening force of the first fastening member 500 with respect to the first mounting member 30*a*.

Hereinafter, a configuration of a brake apparatus 2 for a vehicle in accordance with a second embodiment of the present disclosure will be described.

In this process, for convenience of description, description overlapping the brake apparatus 1 for a vehicle in accordance with the first embodiment of the present disclosure will be omitted.

Figure 7:
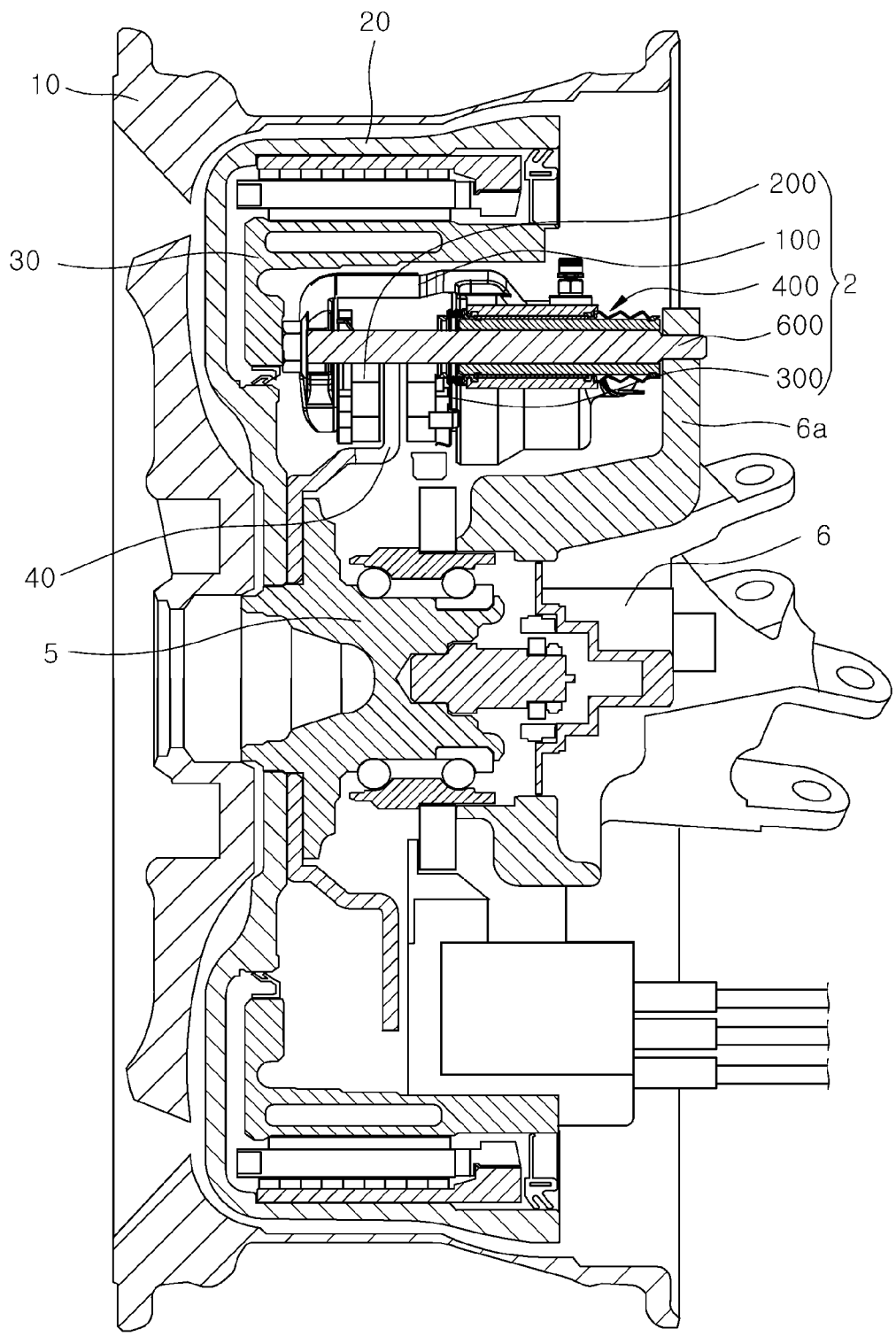
FIG. 7 is a view schematically illustrating an installation state of a brake apparatus for a vehicle in accordance with a second embodiment of the present disclosure.
Figure 8:
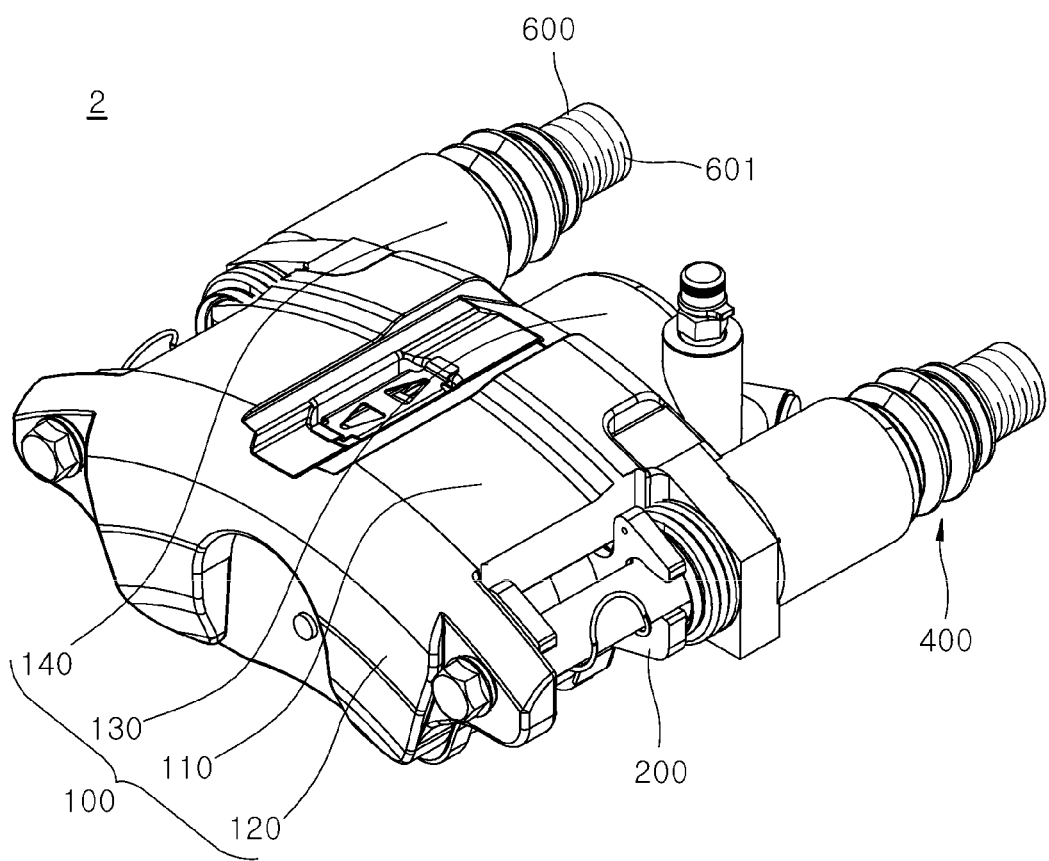
FIG. 8 is a perspective view schematically illustrating the configuration of the brake apparatus for a vehicle in accordance with the second embodiment of the present disclosure.
Figure 9:
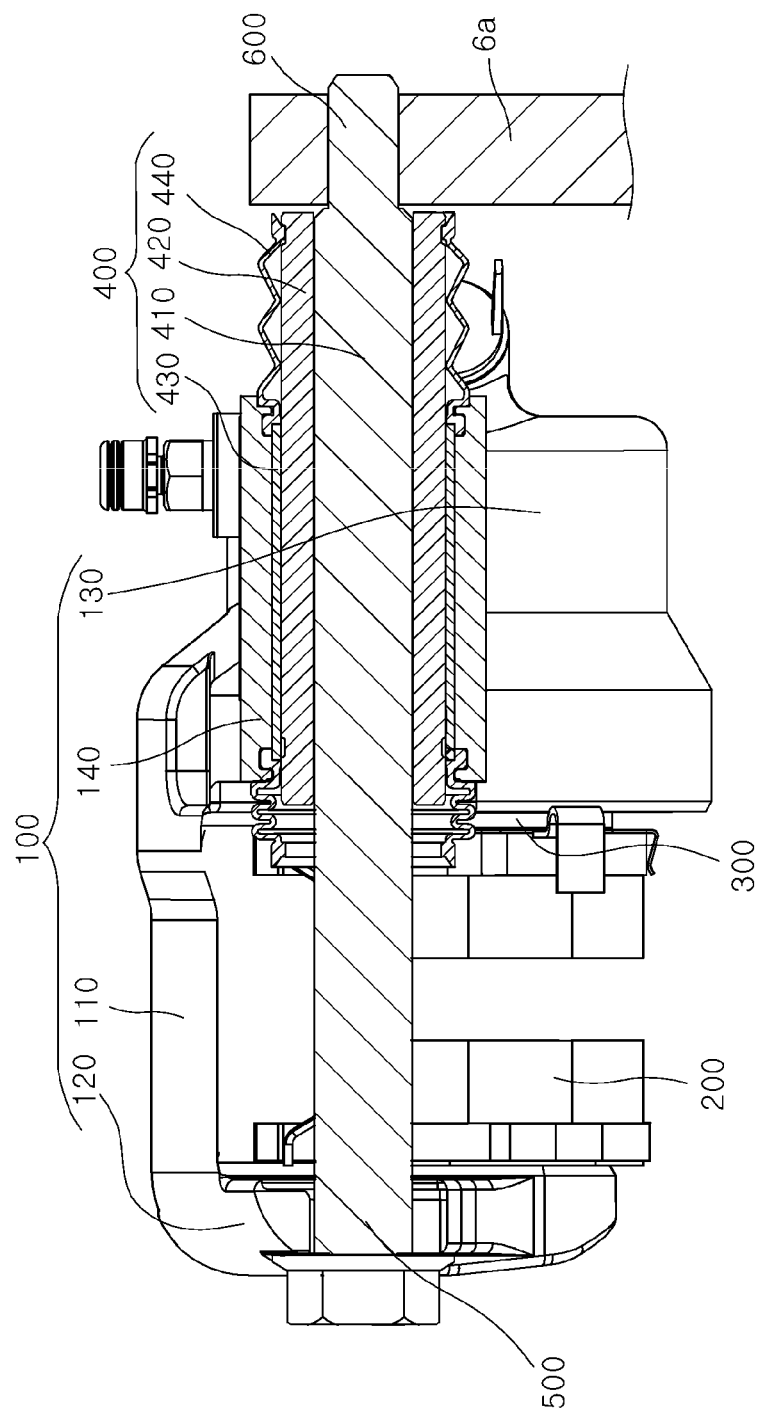
FIG. 9 is a cross-sectional view schematically illustrating the configuration of the brake apparatus for a vehicle in accordance with the second embodiment of the present disclosure.

FIG. 7 is a view schematically illustrating an installation state of the brake apparatus 2 for a vehicle in accordance with the second embodiment of the present disclosure, FIG. 8 is a perspective view schematically illustrating the configuration of the brake apparatus 2 for a vehicle in accordance with the second embodiment of the present disclosure, and FIG. 9 is a cross-sectional view schematically illustrating the configuration of the brake apparatus 2 for a vehicle in accordance with the second embodiment of the present disclosure.

Referring to FIG. 7 to FIG. 9, the brake apparatus 2 for a vehicle in accordance with the second embodiment of the present disclosure includes the caliper body module 100, the pad plate part 200, the piston module 300, the guide member 400, and a second fastening member 600.

A guide pin part 410 in accordance with the second embodiment of the present disclosure is disposed in a direction opposite to the guide pin part 410 in accordance with the first embodiment of the present disclosure.

More specifically, in the guide pin part 410 in accordance with the second embodiment of the present disclosure, as a front end thereof penetrates the finger part 120 and then is inserted into a front surface of the accommodating part 140, the front and rear ends thereof are disposed on the rear and front sides of the caliper body module 100, respectively. Accordingly, the guide pin part 410 may cause the second fastening member 600 to be described below to extend toward a second mounting member 6a formed on the rear side of the caliper body module 100. A head part formed at the rear end of the guide pin part 410 is supported in contact with the outer side surface of the finger part 120.

As illustrated in FIG. 9, as the length of the accommodating part 140 is formed to be shorter than that of the guide pin part 410, the guide pin part 410 may movably support the pad plate part 200. More specifically, as the pad plate part 200 is slidably mounted on the outer circumferential surface of a rear portion of the guide pin part 410 exposed to an exterior, the guide pin part 410 may guide the movement of the pad plate part 200.

The second fastening member 600 extends from the guide member 400. The second fastening member 600 is detachably fastened to the second mounting member 6a provided in the knuckle 6, and supports the caliper body module 100. The second fastening member 600 may be disposed on substantially the same axial line as the guide member 400. Accordingly, the second fastening member 600 may play a role of a torque member, which is formed in an existing brake caliper, on substantially the same axial line as the guide member 400, thereby more easily satisfying the internal layout conditions of the in-wheel.

The second mounting member 6a extends from the knuckle 6 and is disposed to face the rear surface of the caliper body module 100. The second mounting member 6a may be integrally formed with the knuckle 6, or may be manufactured separately from the knuckle 6 and fixed to the knuckle 6. The second mounting member 6a may have a through hole formed at the end thereof and into which the second fastening member 600 is inserted. The through hole of the second mounting member 6a may be disposed to face the second fastening member 600, and a central axis of the through hole may be disposed on substantially the same axial line as the central axis C of the guide member 400.

The second fastening member 600 in accordance with the present embodiment may be formed in a rod shape extending horizontally from the front end of the guide pin part 410 along the longitudinal direction of the guide member 400. A central axis of the second fastening member 600 is disposed on substantially the same axial line as the central axis C of the guide pin part 410. The second fastening member 600 protrudes from the rear surface of the accommodating part 140 by a predetermined distance. The protruding distance of the second fastening member 600 may be changed in design to various values according to a distance between the front end of the guide pin part 410 and the second mounting member 6a, and the like. In a state in which the rotator 20, the stator 30, and the disk module 40 are assembled into the wheel 10 and then the caliper body module 100 is temporarily assembled on the disk module 40, the second fastening member 600 is fastened to the second mounting member 6a to fix the position of the caliper body module 100.

A second fastening reinforcing part 601 may be provided on an outer periphery of the second fastening member 600 to reinforce a fastening force of the second fastening member 600 with respect to the second mounting member 6a.

The second fastening reinforcing part 601 in accordance with the present embodiment may be formed in the form of threads that protrude from the outer circumferential surface of the second fastening member 600 and extend along the longitudinal direction of the second fastening member 600. In such a case, threads corresponding to the second fastening reinforcing part 601 may be formed on the inner circumferential surface of the second mounting member 6a. The shape of the second fastening reinforcing part 601 is not limited to the shape of the thread, and may be variously changed in design within the technical spirit of a shape capable of reinforcing the fastening force of the second fastening member 600 with respect to the second mounting member 6a.

In the brake apparatus 2 for a vehicle in accordance with the second embodiment of the present disclosure, the installation state of the guide pin part 410 and the second fastening member 600 may be changed according to the position of the second mounting member 6a.

Figure 10:
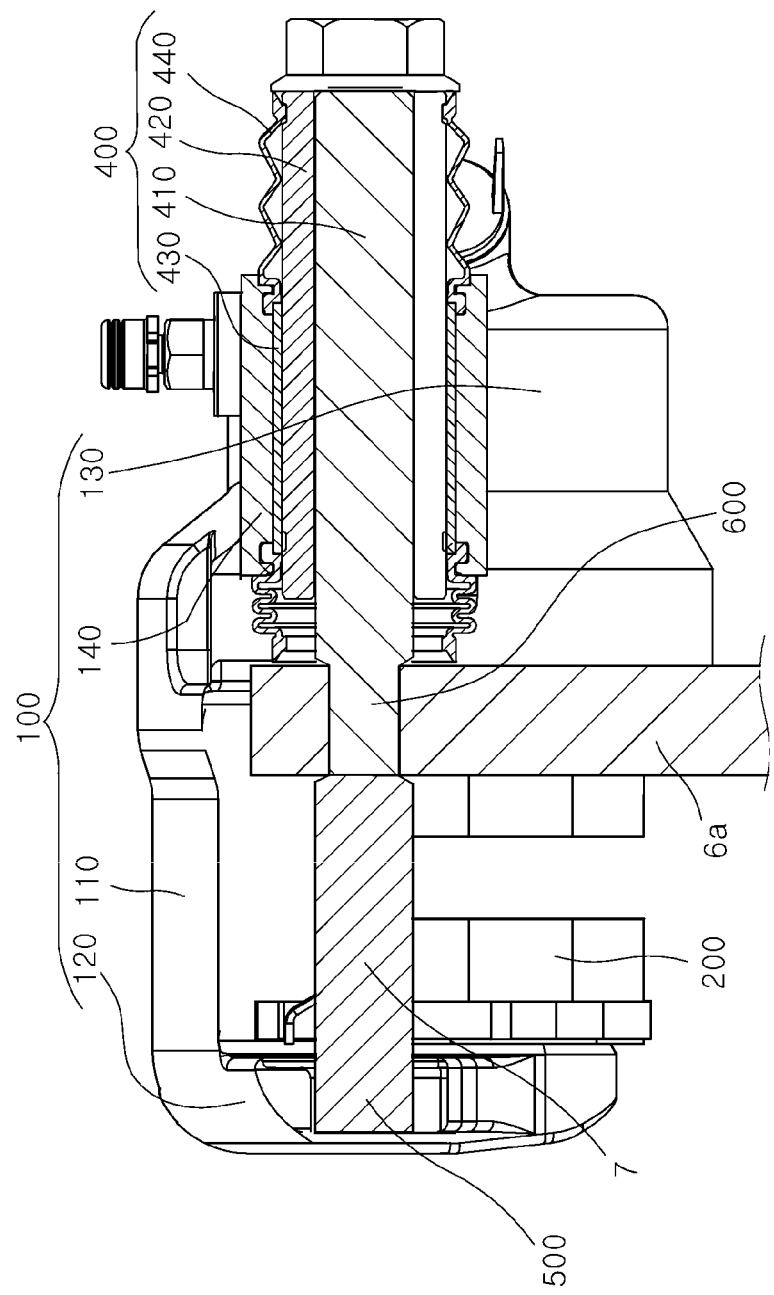
FIG. 10 is a cross-sectional view illustrating a case where a second mounting part is disposed at a position different from that of FIG. 9.

FIG. 10 is a cross-sectional view illustrating a case where the second mounting part 6a is disposed at a position different from that of FIG. 9.

Referring to FIG. 10, when the second mounting part 6a is located in the middle of the caliper body module 100, more specifically, in front of the accommodating part 140, the guide pin part 410 is formed to have a length corresponding to that of the accommodating part 140 and the front end of the guide pin part 410 is inserted into the rear surface of the accommodating part 140.

The second fastening member 600 is formed to extend from the front end of the guide pin part 410 and to protrude from the front end of the accommodating part 140 by a predetermined distance. The second fastening member 600 is inserted into the through hole of the second mounting member 6a and is fastened to the second mounting member 6a.

The front end of the second fastening member 600 may extend toward the finger part 120 to directly penetrate the finger part 120, or as illustrated in FIG. 10, the second fastening member 600 may be formed separately from the guide pin part 410 and coupled to the other side of a fixing pin 7 having one side that penetrates the finger part 120.

The fixing pin 7 may movably support the pad plate part 200 while the pad plate part 200 is mounted on the outer circumferential surface thereof.

Hereinafter, a configuration of a brake apparatus 3 for a vehicle in accordance with a third embodiment of the present disclosure will be described.

Figure 11:
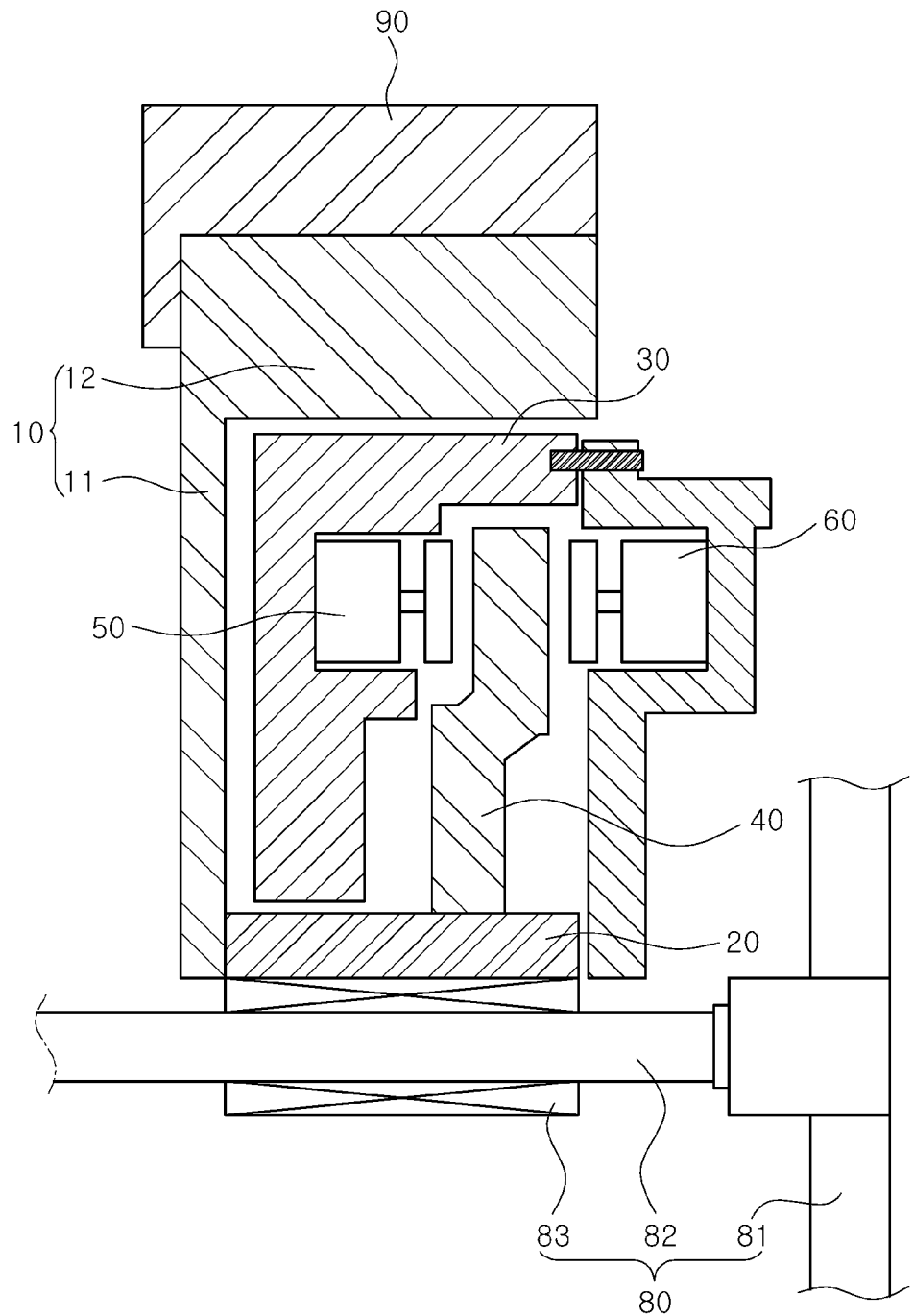
FIG. 11 is a view schematically illustrating a brake apparatus for a vehicle in accordance with a third embodiment of the present disclosure.

FIG. 11 is a view schematically illustrating the brake apparatus 3 for a vehicle in accordance with the third embodiment of the present disclosure. Referring to FIG. 11, the brake apparatus 3 for a vehicle in accordance with the third embodiment of the present disclosure includes a wheel 10, a rotator 20, a stator 30, a disk module 40, an internal braking device 50, and an external braking device 60.

The wheel 10 is rotated in connection with the rotator 20 to be described below. For example, the wheel 10 may include a wheel connection part 11 coupled to the rotator 20 and a wheel rim part 12 formed at an end of the wheel connection part 11 and having a rim shape surrounding the stator 30. The stator 30 may be disposed between the rotator 20 and the wheel rim part 12 due to such a shape of the wheel 10.

The stator 30 is disposed inside the wheel 10 and a tire 90 is mounted on the outer side of the wheel 10. For example, the stator 30 may include an iron core that supports a winding and a frame that supports the iron core.

The rotor 20 is disposed inside the stator 30 and is rotated when power is applied to the stator 30. For example, the stator 30 generates a rotating magnetic field by sequentially applying power to each winding, and the rotor 20 penetrating the stator 30 is rotated along the rotating magnetic field.

Meanwhile, a fixed unit 80 mounted on a vehicle body may include a fixed coupling part 81 coupled to the stator 30, a fixed shaft part 82 formed in the center of the fixed coupling part 81 and configured to penetrate the rotor 20, and a shaft bearing part 83 mounted on the fixed shaft part 82 and configured to rotatably support the rotor 20.

The disk module 40 is interlocked with the rotor 20. For example, an inner circumferential surface of the disk module 40 may be coupled to the outer side of the rotor 20, and an outer circumferential surface thereof may be disposed between the internal braking device 50 and the external braking device 60.

The internal braking device 50 is mounted on the stator 30 to provide a frictional force to one side of the disk module 40. The external braking device 60 is mounted on the stator 30 to provide a frictional force to the other side of the disk module 40. For example, the internal braking device 50 and the external braking device 60 may be simultaneously driven to press both surfaces of the disk module 40, thereby providing a braking force.

Figure 12:
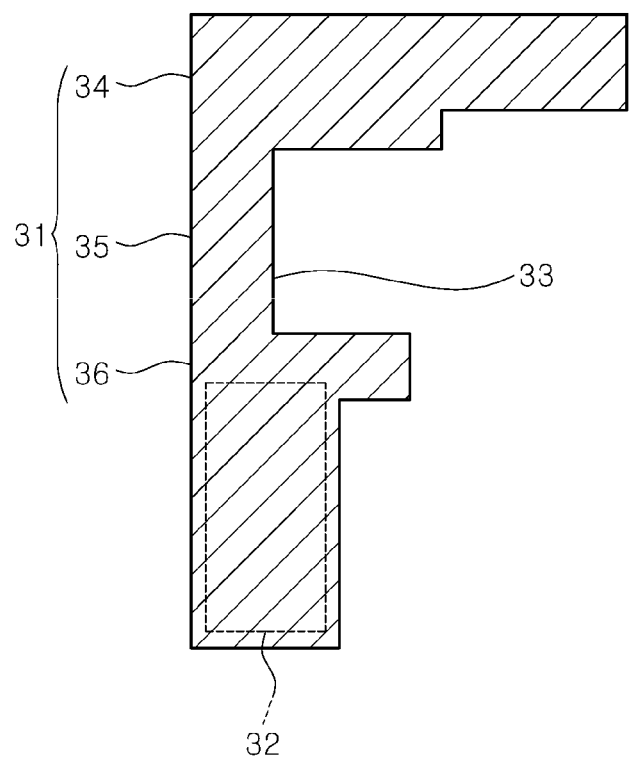
FIG. 12 is a view schematically illustrating a stator in accordance with the third embodiment of the present disclosure.

FIG. 12 is a view schematically illustrating the stator 30 in accordance with the third embodiment of the present disclosure. Referring to FIG. 12, the stator 30 in accordance with the present embodiment may include a housing unit 31, a stator body 32, and an internal space 33.

The housing unit 31 is fixedly coupled to the fixed unit 80 and is mounted with the external braking device 60. For example, the housing unit 31 may include a first housing part 34 disposed inside the wheel rim part 12, a second housing part 35 extending inward from an end of the first housing part 34, and a third housing part 36 extending from an end of the second housing part 35 and configured to surround the rotor 20. The first housing part 34, the second housing part 35, and the third housing part 36 may be integrally formed, or may be separated. Not only the fixed coupling part 81 but also the external braking device 60 may be assembled to the end of the first housing part 34. Meanwhile, a length of the first housing part 34 may be formed to be longer than that of the third housing part 36, so that the disk module 40 may not interfere with the third housing part 36.

The stator body 32 is mounted on the housing unit 31, is disposed to surround the rotor 20, and rotates the rotor 20 when power is applied. For example, the stator body 32 may be embedded in the third housing part 36.

The internal space 33 is formed in the housing unit 31 and forms a space into which the internal braking device 50 is inserted. For example, the internal space 33 may be a space formed among the first housing part 34, the second housing part 35, and the third housing part 36. In addition, the internal space 33 may be a groove formed in the housing unit 31, which corresponds to the disk module 40.

Figure 13:
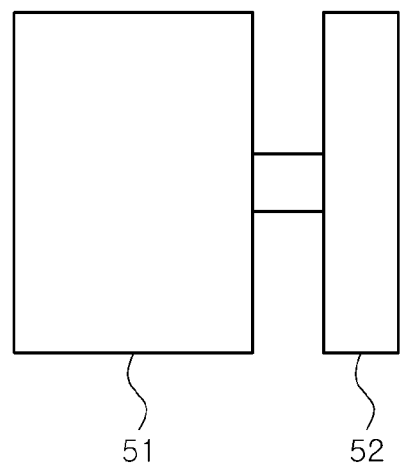
FIG. 13 is a view schematically illustrating a first modification of an internal braking device in accordance with the third embodiment of the present disclosure.

FIG. 13 is a view schematically illustrating a first modification of the internal braking device 50 in accordance with the third embodiment of the present disclosure. Referring to FIG. 13, the internal braking device 50 in accordance with the present modification includes an internal piston part 51 and an internal pad part 52.

The internal piston part 51 is mounted in the internal space 33 and has a variable length. For example, the internal piston part 51 itself may be inserted into the internal space 33 and fixedly installed in the housing unit 31.

The internal pad part 52 is mounted on the internal piston part 51 and is in surface contact with the disk module 40 according to a change in the length of the internal piston part 51. For example, the internal pad part 52 may protrude from the internal space 33 to be in close contact with the disk module 40 when braking is required.

Figure 14:
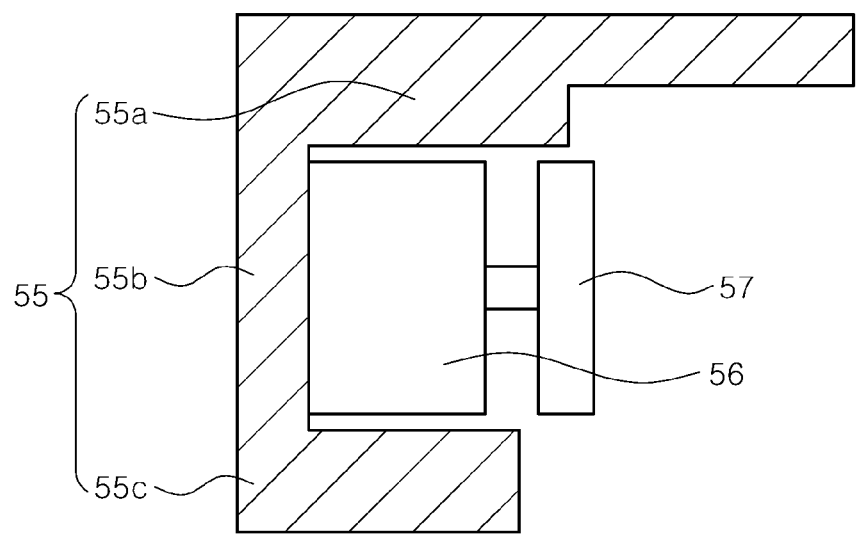
FIG. 14 is a view schematically illustrating a second modification of the internal braking device in accordance with the third embodiment of the present disclosure.

FIG. 14 is a view schematically illustrating a second modification of the internal braking device 50 in accordance with the third embodiment of the present disclosure. Referring to FIG. 14, the internal braking device 50 in accordance with the present modification includes an internal case 55, an internal variable part 56, and an internal contact part 57.

The internal case 55 is mounted in the internal space 33 and is coupled to the external braking device 60. For example, the internal case 55 may include a first internal case part 55a disposed inside the first housing part 34 and configured to surround the disk module 40, a second internal case part 55b extending inward from an end of the first internal case part 55a and coupled to the second housing part 35, and a third internal case part 55c extending laterally from the second internal case part 55b and supported by the third housing part 36. Meanwhile, a length of the first internal case part 55a may be formed to be longer than that of the third internal case part 55c, so that the disk module 40 may not interfere with the third internal case part 55c.

The internal variable part 56 is mounted in the internal case 55 and has a variable length. The internal contact part 57 is mounted on the internal variable part 56 and is in surface contact with the disk module 40 according to a change in the length of the internal variable part 56. Since the internal variable part 56 and the internal contact part 57 correspond to the internal piston part 51 and the internal pad part 52 in FIG. 13, detailed description thereof will be omitted.

Figure 15:
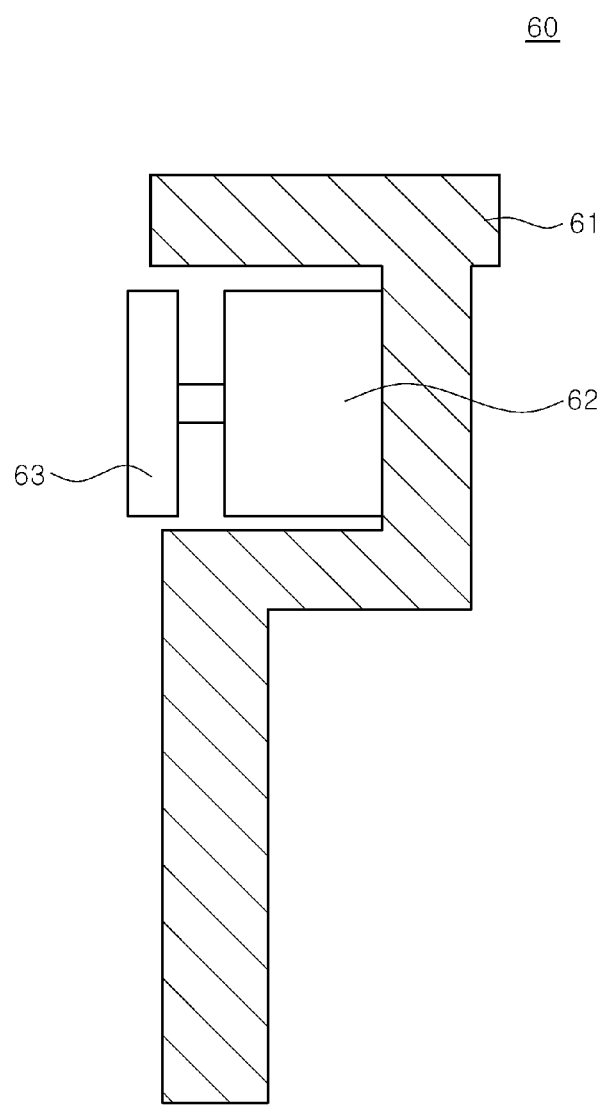
FIG. 15 is a view schematically illustrating an external braking device in accordance with the third embodiment of the present disclosure.

FIG. 15 is a view schematically illustrating the external braking device 60 in accordance with the third embodiment of the present disclosure. Referring to FIG. 15, the external braking device 60 in accordance with the present modification includes an external case 61, an external variable part 62, and an external contact part 63.

The external case 61 is coupled to the stator 30. For example, the external case 61 may be coupled to an end of the first housing part 34. The external case 61 may be coupled to the first internal case part 55a. In addition, the external case 61 may be additionally coupled to the fixed unit 80.

The external variable part 62 is mounted in the external case 61 and has a variable length. The external contact part 63 is mounted on the external variable part 62 and is in surface contact with the disk module 40 according to a change in the length of the external variable part 62. Since the external variable part 62 and the external contact part 63 correspond to the internal variable part 56 and the internal contact part 57 in FIG. 14, detailed description thereof will be omitted.

The assembly and operation of the brake apparatus 3 for a vehicle having the above structure in accordance with the third embodiment of the present disclosure will be described as follows.

The stator 30 is inserted into the wheel 10 and the internal braking device 50 is mounted on the stator 30. Then, the rotor 20 is inserted into the stator 30, and is disposed so that the rotor 20 is coupled to the wheel 10 and the disk module 40 connected to the rotor 20 faces the internal braking device 50.

When the above assembly is completed, the external braking device 60 is mounted on the stator 30. At this time, the external braking device 60 is disposed to face the internal braking device 50, and the disk module 40 is disposed between the internal braking device 50 and the external braking device 60.

When the assembly of the external braking device 60 is completed, the rotor 20 is mounted on the fixed unit 80. At this time, the rotor 20 is rotatably supported by the shaft bearing part 83 and the stator 30 is mounted on the fixed coupling part 81. Therefore, the stator 30 remains fixed to the vehicle body.

When power is applied to the stator 30 in the above state, the rotor 20 disposed inside the stator 30 is rotated and the wheel 10 coupled to the rotor 20 is rotated, so that a vehicle is moved.

When braking for the moving vehicle is required, power is applied to the internal braking device 50 and the external braking device 60, so that the internal braking device 50 and the external braking device 60 are in close contact with the disk module 40 to limit the rotation of the rotor 20.

In the brake apparatus 3 for a vehicle in accordance with the third embodiment of the present disclosure, the internal braking device 50 and the external braking device 60 are fixed to the stator 30, so that the assembling efficiency of the vehicle body may be improved and the rigidity of the internal braking device 50 and the external braking device 60 may be secured.

Although the present disclosure has been described with reference to the embodiments illustrated in the drawings, the embodiments of the disclosure are for illustrative purposes only, and those skilled in the art to which the present technology pertains will appreciate that various modifications and other equivalent embodiments are possible from the embodiments. Thus, the true technical scope of the present disclosure should be defined by the following claims.

What is claimed is:

1. A brake apparatus for a vehicle, comprising:
   a caliper body module provided with a finger part and a cylinder part spaced apart from each other and facing each other;
   a pad plate part disposed between the finger part and the cylinder part, and configured to selectively come into contact with a disk module rotated together with a rotor to generate a braking force;
   a piston module installed in the cylinder part to be movable forward and backward and configured to press the pad plate part;
   a guide member disposed on both sides of the caliper body module and configured to movably support the caliper body module; and
   a first fastening member extending from the guide member and fastened to a first mounting member provided in a stator.

2. The brake apparatus according to claim 1, wherein the first fastening member is disposed on substantially the same axial line as the guide member.

3. The brake apparatus according to claim 2, wherein the first fastening member protrudes to an outside of the finger part along a longitudinal direction of the guide member.

4. The brake apparatus according to claim 2, further comprising a first fastening reinforcing part provided on an outer periphery of the first fastening member to reinforce a fastening force of the first fastening member with respect to the first mounting member.

5. The brake apparatus according to claim 1, wherein a central axis of the guide member is disposed at substantially the same height as a center of gravity of the caliper body module.

6. The brake apparatus according to claim 5, wherein the guide member comprises:
   a guide pin part configured to penetrate the caliper body module and disposed in a direction parallel to a forward and backward movement direction of the piston module;
   a friction reduction part configured to surround the guide pin part;
   a movement part slidably connected to the friction reduction part and configured to move the caliper body module by a pressing force of the piston module; and
   a blocking part configured to block foreign substances from entering between the caliper body module and the friction reduction part.

7. The brake apparatus according to claim 6, wherein the guide pin part has one side connected through the finger part.

8. The brake apparatus according to claim 6, wherein the guide pin part movably supports the pad plate part.

9. A brake apparatus for a vehicle, comprising:
   a caliper body module provided with a finger part and a cylinder part spaced apart from each other and facing each other;
   a pad plate part disposed between the finger part and the cylinder part, and configured to selectively come into contact with a disk module rotated together with a rotor to generate a braking force;
   a piston module installed in the cylinder part to be movable forward and backward and pressing the pad plate part;
   a guide member disposed on both sides of the caliper body module and configured to movably support the caliper body module; and
   a fastening member extending from the guide member and fastened to a mounting member provided on a knuckle.

10. The brake apparatus according to claim 9, wherein the fastening member is disposed on substantially the same axial line as the guide member.

11. The brake apparatus according to claim 10, wherein the fastening member protrudes to an outside of the caliper body module along a longitudinal direction of the guide member.

12. The brake apparatus according to claim 10, further comprising a fastening reinforcing part provided on an outer periphery of the fastening member to reinforce a force of the fastening member with respect to the mounting member.

13. The brake apparatus according to claim 9, wherein a central axis of the guide member is disposed at substantially the same height as a gravity axis of the caliper body module.

14. The brake apparatus according to claim 13, wherein the guide member comprises:
   a guide pin part configured to penetrate the caliper body module and disposed in a direction parallel to a forward and backward movement direction of the piston module;
   a friction reduction part configured to surround the guide pin part;
   a movement part slidably connected to the friction reduction part and configured to move the caliper body module by a pressing force of the piston module; and
   a blocking part configured to block foreign substances from entering between the caliper body module and the friction reduction part.

15. The brake apparatus according to claim 14, wherein the guide pin part has one side connected through the finger part.

16. A brake apparatus for a vehicle, comprising:
- a stator;
- a rotor disposed inside the stator and rotated when power is applied to the stator;
- a wheel rotated in connection with the rotor;
- a disk module interlocked with the rotor;
- an internal braking device mounted on the stator and configured to provide a frictional force to one side of the disk module; and
- an external braking device mounted on the stator and configured to provide a frictional force to the other side of the disk module, wherein the stator comprises:
- a housing unit mounted with the external braking device and fixedly coupled to a fixed unit;
- a stator body mounted on the housing unit and configured to surround the rotor and rotate the rotor when power is applied; and
- an internal space in the housing unit configured to accommodate the internal braking device.

17. The brake apparatus according to claim 16, wherein the internal braking device comprises:
- an internal piston part mounted in the internal space and having a variable length; and
- an internal pad part mounted on the internal piston part and being in surface contact with the disk module according to a change in the length of the internal piston part.

18. The brake apparatus according to claim 16, wherein the internal braking device comprises:
- an internal case mounted in the internal space and coupled to the external braking device;
- an internal variable part mounted in the internal case and having a variable length; and
- an internal contact part mounted on the internal variable part and being in surface contact with the disk module according to a change in the length of the internal variable part.

19. The brake apparatus according to claim 16, wherein the external braking device comprises:
- an external case coupled to the stator;
- an external variable part mounted in the external case and having a variable length; and
- an external contact part mounted on the external variable part and being in surface contact with the disk module according to a change in the length of the external variable part.

* * * * *